United States Patent [19]
Simpson

[11] Patent Number: 6,141,316
[45] Date of Patent: Oct. 31, 2000

[54] OPTICAL DISK FOR HIGH SPEED DATA RECORDING AND PLAYBACK

[75] Inventor: Charles J. Simpson, Rochester, N.Y.

[73] Assignee: Eastman Kodak Company, Rochester, N.Y.

[21] Appl. No.: 09/033,540

[22] Filed: Mar. 2, 1998

[51] Int. Cl.$^7$ ....................................................... G11B 5/84
[52] U.S. Cl. .......................................................... 369/286
[58] Field of Search ................................... 369/286, 288, 369/283, 284

[56] References Cited

U.S. PATENT DOCUMENTS

| | | | |
|---|---|---|---|
| 4,450,553 | 5/1984 | Holster et al. | 369/286 |
| 5,128,388 | 7/1992 | Komori et al. | 369/286 |
| 5,703,868 | 12/1997 | Kobayashi et al. | 369/286 |
| 5,874,132 | 2/1999 | Jung | 369/286 |
| 5,936,934 | 8/1999 | Kuribayashi | 369/286 |

OTHER PUBLICATIONS

Formulas for Natural Frequency and Mode Shape, by Robert D. Blevins, Ph.D., Robert E. Krieger Publishing Company, Malabar, Florida (1979), pp. 237–238, 240–244, 246–248.

*Primary Examiner*—Allen T. Cao
*Attorney, Agent, or Firm*—Pamela R. Crocker

[57] ABSTRACT

An optical disk for high speed data recording and playback is disclosed. The optical disk includes a stiffening layer having two spaced-apart surfaces, the stiffening layer having a specific stiffness selected to be greater than $1*10^8$ inches and being positioned at the center of the thickness of the optical disk. The optical disk further includes first and second recording layers, each recording layer being formed over opposite surfaces of the stiffening layer, and first and second substrates being formed over the first and second recording layers, respectively.

11 Claims, 2 Drawing Sheets

6,141,316

OPTICAL DISK FOR HIGH SPEED DATA RECORDING AND PLAYBACK

FIELD OF THE INVENTION

The present invention relates to the field of optical recording, and in particular, to an optical disk for high speed data recording or playback.

BACKGROUND OF THE INVENTION

Optical storage media has proven to be attractive for the high density storage of information. The use of optical recording disks with recording layers on opposite sides of the disks, such as DVD-R, has further increased the data storage capacity of the disks. As a result, there is a strong desire to achieve higher and higher sustained recording and read back rates to reduce the amount of time required to complete the data recording or read back process. If a single head and data channel are used for recording to an optical disk with a fixed data storage structure, the disk rotation rate must increase at a rate proportional with the increase in recording rate. At high recording speeds, the rotation of the disk can excite resonances in the disk. This typically occurs at rotation speeds greater than 5000 rpm, although imperfections in the ball bearings in the spindle can excite resonances in the disk at much lower rotation speeds. The excited resonances can cause motion of the optical disk, typically in the focus direction, that can be great enough to exceed the capability of the focus actuator in either range of motion or acceleration required to follow the disk surface. This results in focus performance degradation or a loss of focus, and subsequently, a failure of the recording or read back process. This failure can increase the time required for data storage or read back due to retries, or in the case of some optical disks that can only be recorded once ("WORM" disks), the subsequent waste of the disk. For a more complete discussion of disk resonant frequencies, see *Formulas for Natural Frequency and Mode Shape*, Robert D. Blevins Ph.D., Robert E. Krieger Publishing Company, Malabar, Fla. (1979).

SUMMARY OF THE INVENTION

Accordingly, it is an object of the present invention to provide an optical disk capable of operating at high speed which overcomes the above-mentioned problems.

This object is achieved by an optical disk for high speed data recording and playback, comprising:

(a) a stiffening layer having two spaced-apart surfaces, the stiffening layer having a specific stiffness selected to be greater than $1*10^8$ inches;

(b) first and second recording layers, each recording layer being formed over opposite surfaces of the stiffening layer;

(c) first and second substrates being formed over the first and second recording layers, respectively; and (d) the stiffening layer being positioned at the center of the thickness of the optical disk.

ADVANTAGES

An advantage of the present invention is to provide an optical disk having substantially reduced loss of focus or focus performance degradation caused by excited disk resonances during high speed data recording and playback.

Another advantage of the present invention is to provide an optical disk including a stiffening layer which substantially reduces the effect of disk resonances at the recording and playback speed of interest.

Yet another advantage of the present invention is to substantially reduce the time required for data storage or read back.

DETAILED DESCRIPTION OF THE INVENTION

Figure 1:
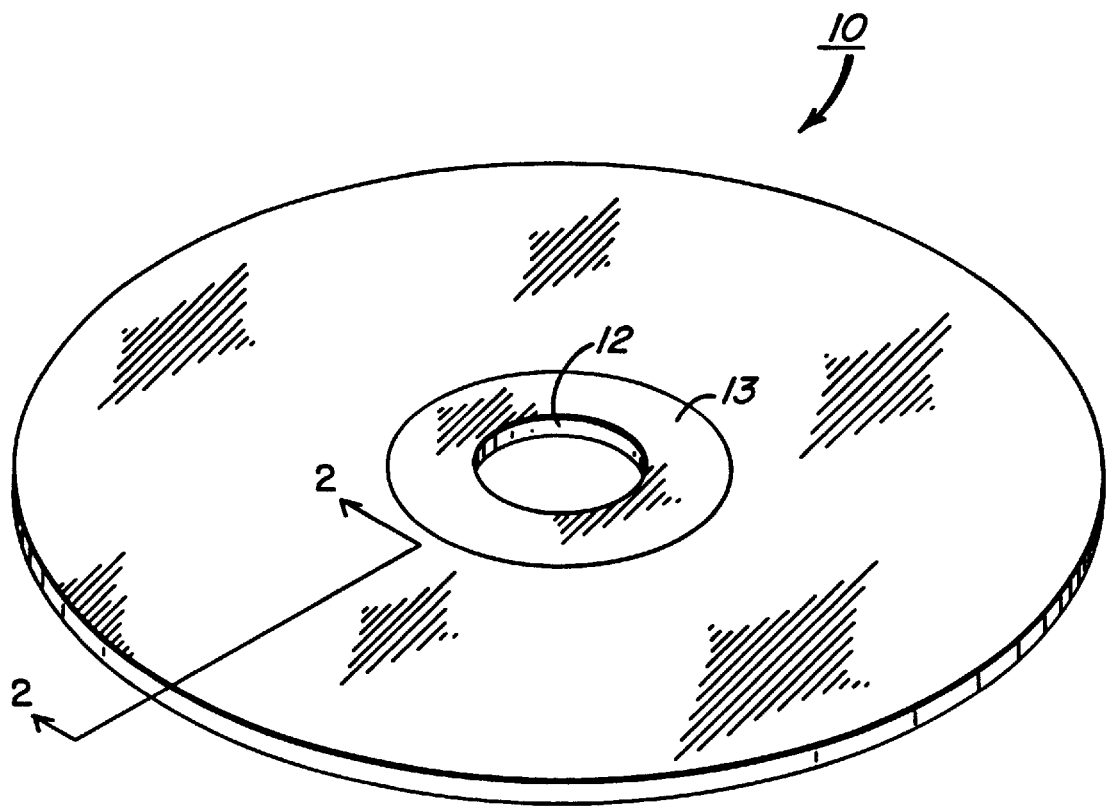
FIG. 1 is a perspective of an optical disk in accordance with the present invention.

Referring to FIG. 1, an optical disk 10 in accordance with the present invention is shown. The optical disk 10 includes a central hole 12 which permits the optical disk 10 to be mounted in an optical disk device (not shown) which can be used in either a reading or writing mode. A clamping region 13 is adjacent the central hole 12 and is the portion of the optical disk 10 where the spindle clamp (not shown) secures the optical disk 10 to the spindle (not shown). The spindle clamp conventionally applies a force so that the clamping region 13 is pressed against the spindle.

Figure 2:
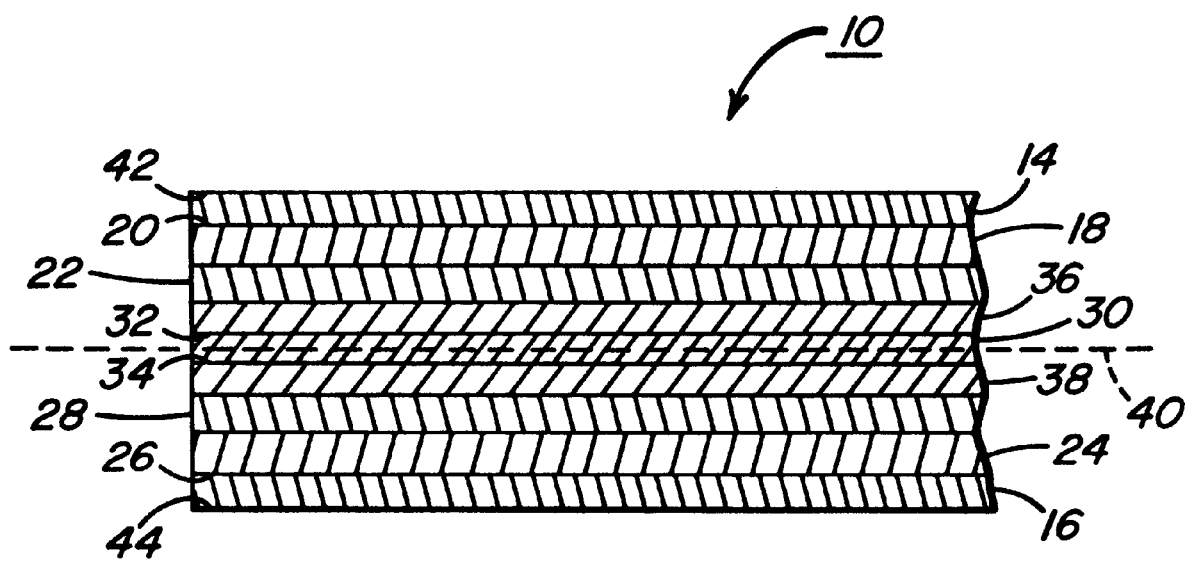
FIG. 2 is a cross-sectional view of the optical disk of FIG. 1 taken along the line 2—2 of FIG. 1.

FIG. 2 shows a cross-sectional view of the optical disk 10 taken along the line 2—2 of FIG. 1. As shown in FIG. 2, the optical disk 10 includes a first substrate 14 and a second substrate 16. The first and second substrates 14 and 16 can be transparent material of, for example, glass, polycarbonate, acetate or acrylic resin, with polycarbonate being a preferred material. In the preferred embodiment of the present invention, the first substrate 14 and the second substrate 16 are each approximately 0.6 mm thick.

A first recording layer 18 is formed over a first surface 20 of the first substrate 14, and a second recording layer 24 is formed over a first surface 26 of the second substrate 16. The first and second recording layers 18 and 24 can be any suitable material known in the art for optical recording including, for example, a phase change material, or material which has a binder, a polymer, and a dye which changes properties upon actuation by laser light at a particular wavelength and above a particular intensity.

A first reflective layer 22 is formed over the first recording layer 18, and a second reflective layer 28 is formed over the second recording layer 24. The first and second reflective layers 22 and 28 can be any of the metals conventionally used for optical recording materials. Useful metals can be vacuum evaporated or sputtered, and include gold, silver, aluminum, copper, and alloys thereof. Gold is the preferred reflective layer material. It will be understood to those skilled in the art that if the first recording layer 18 and the second recording layer 24 include phase change material, the reflectivity of the first recording layer 18 and the second recording layer 24 may be great enough to also act as the first reflective layer 22 and the second reflective layer 28, respectively.

The optical disk 10 further includes a stiffening layer 30 having a first surface 32 and a spaced-apart second surface 34. The first reflective layer 22 is bonded to the first surface 32 of the stiffening layer 30 using a first adhesive layer 36. The second reflective layer 28 is bonded to the second surface 34 of the stiffening layer 30 using a second adhesive layer 38. In accordance with the present invention, the stiffening layer 30 is bonded to the first and second reflective layers 22 and 28 so that the stiffening layer 30 is positioned at the center of the thickness 40 of the optical disk 10, as shown in FIG. 2. By positioning the stiffening layer 30 at the center of the thickness of the optical disk 10, the useful optical properties of the optical disk 10 are not altered.

With regard to the stiffening layer 30, any material having a high specific stiffness greater than $1*10^8$ inches can be used. Such material includes, for example, steel, aluminum, or graphite epoxy composites. Preferably, the thickness of the stiffening layer 30 is approximately 0.5 mm. The first and second adhesive layers 36 and 38 can be any suitable material, such as plastic or epoxy, which is thermally-activated.

It will be understood by those skilled in the art that transparent protective overcoat layers (not shown) can be formed over a second surface 42 of the first substrate 14 and over a second surface 44 of the second substrate 16. Such protective overcoat layers can be made from any suitable material, such as SiO, AlN, ZnS, or an optically transparent resin. The structure is then laminated together to form the optical disk 10 by, for example, thermally-activated lamination, spin lamination, or pressure lamination.

It will be appreciated by those skilled in the art that inclusion of the stiffening layer 30 in accordance with the present invention increases the maximum allowable rotation rate of the optical disk 10 when disk resonances are excited during high speed data recording and playback, and decreases the dependence of these resonant frequency levels on the quality of the spindle clamp (not shown) that attaches the optical disk 10 to the spindle (not shown). As a result, loss of focus or focus performance degradation caused by the excited resonances is substantially reduced. Further, the optical disk 10 in accordance with the present invention substantially reduces the time required for data storage or read back.

The invention has been described in detail with particular reference to certain preferred embodiments thereof, but it will be understood that variations and modifications can be effected within the spirit and scope of the invention.

| PARTS LIST | |
|---|---|
| 10 | optical disk |
| 12 | central hole |
| 13 | clamping region |
| 14 | first substrate |
| 16 | second substrate |
| 18 | first recording layer |
| 20 | first surface of the first substrate |
| 22 | first reflective layer |
| 24 | second recording layer |
| 26 | first surface of the second substrate |
| 28 | second reflective layer |
| 30 | stiffening layer |
| 32 | first surface of the stiffening layer |
| 34 | second surface of the stiffening layer |
| 36 | first adhesive layer |
| 38 | second adhesive layer |
| 40 | center of the thickness of the optical disk |
| 42 | second surface of the first substrate |
| 44 | second surface of the second substrate |

What is claimed is:

1. An optical disk for high speed data recording and playback, comprising:

(a) a stiffening layer having two spaced-apart surfaces, the stiffening layer having a specific stiffness selected to be greater than $1*10^8$ inches;

(b) first and second recording layers, each recording layer being formed over opposite surfaces of the stiffening layer;

(c) first and second substrates being formed over the first and second recording layers, respectively; and (d) the stiffening layer being positioned at the center of the thickness of the optical disk.

2. The optical disk according to claim 1 wherein the stiffening layer includes steel.

3. The optical disk according to claim 1 wherein the stiffening layer includes aluminum.

4. The optical disk according to claim 1 wherein the stiffening layer includes a graphite epoxy composite material.

5. The optical disk according to claim 1 wherein the first and second substrates each include glass, polycarbonate, acetate, or acrylic resin.

6. An optical disk for high speed data recording and playback, comprising:

(a) a stiffening layer having two spaced-apart surfaces, the stiffening layer having a specific stiffness selected to be greater than $1*10^8$ inches;

(b) first and second reflective layers, each reflective layer being formed over opposite surfaces of the stiffening layer;

(c) first and second adhesive layers for bonding the stiffening layer to the first and second reflective layers, respectively;

(d) first and second recording layers formed over the first and second reflective layers, respectively, (e) first and second substrates being formed over the first and second recording layers, respectively; and (f) the stiffening layer being positioned at the center of the thickness of the optical disk.

7. The optical disk according to claim 6 wherein the stiffening layer includes steel.

8. The optical disk according to claim 6 wherein the stiffening layer includes aluminum.

9. The optical disk according to claim 6 wherein the stiffening layer includes a graphite epoxy composite material.

10. The optical disk according to claim 6 wherein the first and second substrates each include glass, polycarbonate, acetate, or acrylic resin.

11. The optical disk according to claim 6 wherein the first and second reflective layers each include gold.

* * * * *